Figure 1:
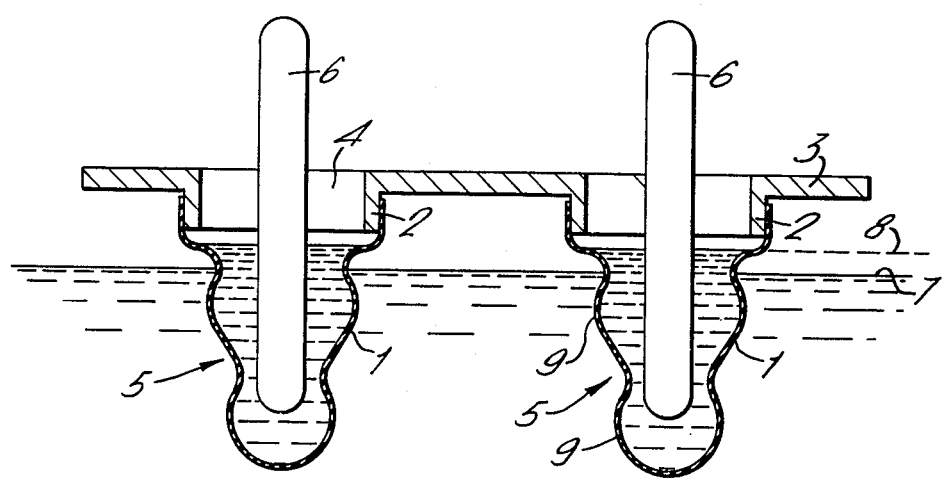

United States Patent [19]

Pooler

[11] 4,104,411
[45] Aug. 1, 1978

[54] FORMING OF ICE LOLLIES AND OTHER CONFECTIONS

[75] Inventor: John Dennis Pooler, Stroud, England

[73] Assignee: Thomas J. Lipton, Inc., Englewood Cliffs, N.J.

[21] Appl. No.: 764,818

[22] Filed: Feb. 2, 1977

Related U.S. Application Data

[63] Continuation of Ser. No. 560,933, Mar. 21, 1975, abandoned.

[30] Foreign Application Priority Data

Mar. 28, 1974 [GB] United Kingdom ............... 13801/74

[51] Int. Cl.² .................................................. A23P 1/00
[52] U.S. Cl. ...................................... 426/421; 426/91; 426/100; 426/515; 219/127; 62/356; 425/126 S
[58] Field of Search .................. 426/91, 100, 101, 134, 426/249, 389, 413, 414, 512, 515; 62/340, 356; 264/28, 313, 334; 249/127; 425/439, 440, 126 S, DIG. 44

[56] References Cited

U.S. PATENT DOCUMENTS

| | | | |
|---|---|---|---|
| 1,619,914 | 3/1927 | Bernotow | 249/127 |
| 2,053,711 | 9/1936 | Blurb | 249/127 X |
| 2,151,282 | 3/1939 | Stamp | 249/127 X |
| 2,246,332 | 6/1941 | Whiteley | 425/DIG. 44 |
| 2,433,211 | 12/1947 | Gits | 249/127 |
| 2,498,645 | 2/1950 | Bobby | 62/356 X |
| 2,631,939 | 3/1953 | Peters | 426/515 X |
| 2,649,057 | 8/1953 | Niklasen | 426/101 X |
| 2,955,044 | 10/1960 | Tupper | 426/515 |
| 3,091,194 | 5/1963 | Dickinson | 426/249 |
| 3,293,697 | 12/1966 | Balint | 264/334 X |
| 3,411,463 | 11/1968 | Moseses | 62/356 X |
| 3,471,301 | 10/1969 | Mitchell | 426/101 X |
| 3,736,767 | 6/1973 | Lukes | 425/439 X |

FOREIGN PATENT DOCUMENTS 14,900 6/1906 Fed. Rep. of Germany ........... 425/440

*Primary Examiner*—Robert Halper
*Attorney, Agent, or Firm*—Brumbaugh, Graves, Donohue & Raymond

[57] ABSTRACT

A method for producing frozen confections of reentrant shape using moulds made of flexible, elastic material, comprising filling moulds made of said material with confection mix, inserting a handle into the mix, contacting the outside of the filled mould with a freezant so as to freeze the mix and anchor the handle, and withdrawing the handle, whereby the mould distorts and expands to release the frozen product. Distortion of the shape of the mould due to the pressure of liquid freezant is avoided by filling the mould with confection mix prior to its immersion in the freezant, partially immersing it until the exterior of the liquid mix has frozen, and then equalizing the levels of the mix and the freezant.

5 Claims, 2 Drawing Figures

U.S. Patent  Aug. 1, 1978  4,104,411

FORMING OF ICE LOLLIES AND OTHER CONFECTIONS

This is a continuation, of application Ser. No. 560,933 now abandoned, filed Mar. 21, 1975.

The present invention relates to the forming of ice confections such as ice lollies, that is confections consisting of a moulded portion of ice cream or water ice usually attached to a handle such as a stick.

Conventionally ice lollies are formed on a mass production scale by filling moulds with ice lolly mix, inserting a stick into the mix in each mould, applying a freezant, eg liquid brine, to the outside of the mould to freeze the ice lolly mix and anchor the stick, applying a heated liquid such as brine to the outside of the mould to release the surface of the ice lolly from the mould cavity, and withdrawing the stick from the mould cavity with the moulded unit attached, to withdraw the complete ice lolly. In some cases a temporary handle is used which removes the confection from the mould but does not form part of the final product.

With such methods, it is generally essential that the mould cavity shape should not be re-entrant, ie the thickness and width of the moulded unit should be constant or progressively increase (ie not decrease at any point) from the deepest part in the mould to the mouth of the mould. This is necessary to enable the moulded article to be removed from the normal metal single-part mould and puts limitations on the shapes of articles which can be produced.

We have found that re-entrant shaped ice confections such as lollies can be produced on a significant scale provided the moulds are formed from a thin-wall flexible elastic material and the moulded ice lolly is removed by withdrawal of the handle. With such a method, when the re-entrant shaped ice lolly is removed from the mould by withdrawing the handle from the mould cavity, this causes the mould to extend elastically, and in some cases turn totally inside out, so as to release an ice confection of the desired shape.

Accordingly the invention provides a method of forming moulded ice confections of re-entrant shape comprising filling ice confection mix into a plurality of thin-wall flexible elastic moulds of re-entrant cavity shape, inserting a handle into the ice confection mix in each mould, applying a freezant to the outer surface of each mould so as to freeze the ice confection mix and anchor the handle, and withdrawing the handle so as to cause the mould to distort and release an ice confection of re-entrant shape on the handle.

In some cases each mould turns progressively inside out, ie progressively introverts, during withdrawal of the handle to unpeel the mould from the ice confection. In other cases dependent on the shape of the mould it is desirable to anchor the mould elastically so as to prevent complete introversion and therefore simplify subsequent operations such as cleaning and re-filling.

In order to minimise any possibility of collapse of the moulds prior to filling, it is preferable that the moulds are filled and only subsequently are introduced into a brine tank for freezing. It has been appreciated that when the moulds are introduced into the liquid freezant (eg brine) tank before filling, pressure from the liquid freezant tends to cause collapse of the unsupported mould walls. These then stick together due to the presence of frozen moisture and make subsequent filling difficult.

Preferably the filled moulds are introduced into the liquid freezant tank to a position where liquid in the moulds is above that in the liquid freezant tank, and are maintained in this position until the shape has set by the exterior of the liquid within the mould becoming frozen. A difference of between ¼ and ⅜ of an inch has been found appropriate. There are two principal reasons for this. The first is to compensate for any overpressure when the freezant is more dense than the ice confection mix: and the second is that a slight hydrostatic overpressure in the moulds has been found beneficial to prevent localised tensions causing distortion of the final moulded product.

The liquid in the mould can be brought to the same level as the liquid in the freezant tank for completion of the freezing operation. This may be achieved by withdrawing unfrozen liquid from the moulds or by immersing the moulds further into the freezant tank.

The ice lolly mix may be water-ice, or ice cream or sherbert or other freezable confection or combinations of these.

As an alternative to filling prior to introduction into the liquid freezant tank, the moulds can be kept open by air pressure immediately prior to filling. A composite probe nozzle can be used which firstly pushes the mould back from the introverted form to the normal form for filling, then applies air pressure from a central jet to ensure that the mould walls do not collapse and stick together from the external hydrostatic pressure, and immediately afterwards applies ice confection mix from a concentric surrounding filling nozzle to fill the mould.

Figure 2:
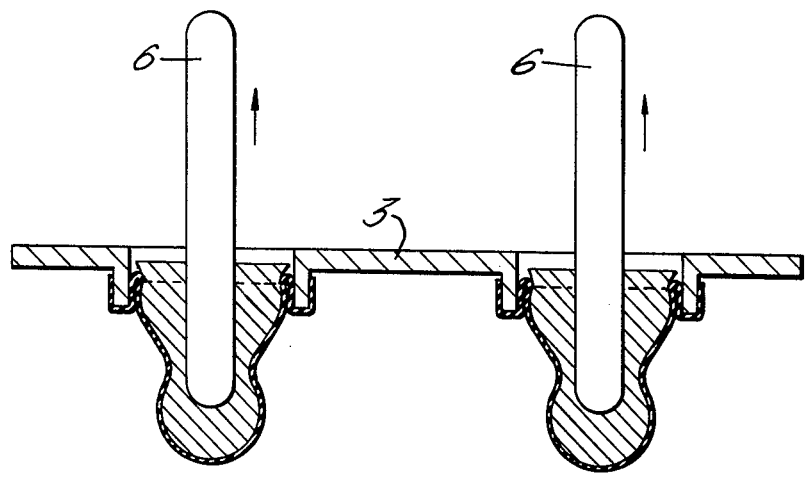

An embodiment of the invention will now be described by way of example with reference to the accompanying diagrammatic drawings in which:

FIG. 1 is a sectioned side elevation of a batch of filled moulds immersed in a brine bath; and FIG. 2 shows commencement of removal of the ice lollies from the moulds.

Referring to FIG. 1, moulds 1 made of a thin-wall flexible elastic material, in this example rubber or latex of 30 thousandths of an inch wall thickness, are attached in each case to a rectangular collar 2 of three-quarters of an inch depth and extending mould opening 4 measuring 2 inches by 1 inch. The mould depth is 4 inches.

The collars 2 extend downwards from a metal top plate 3 which has a size, layout and attachments corresponding to that of a batch of conventional metal moulds, so as to be capable of being handled on conventional ice lolly moulding equipment. In an alternative form, collars are not used and the mouth of each flexible mould is in the shape of a grommet of thicker material having a radial peripheral groove into which the edges of rectangular apertures 4 in the top plate 3 can slot.

As can be seen from the figures, the mould cavity is re-entrant with a particularly waisted zone 5. Such a waisted zone would make if impossible to remove a moulded ice lolly of that shape from a conventional metal mould, however the elastic nature of the mould material allows the material at the waisted zone to extend elastically as the lowermost part of the moulded ice lolly is removed. There is however still one restraint and that is that maximum transverse cross-section of the mould must not exceed the dimensions of the mould opening 4 since the metal top plate cannot expand, and the ice lolly has to be removed through this opening.

In use, the batch of moulds 1 are filled to a pre-determined level with ice lolly mix, eg water-ice, while maintained in free air (ie not immersed in a brine tank).

The top plate 3 is then introduced into a brine freezant bath to a pre-determined level 7 (the level shown in FIG. 1). At that stage the ice lolly mix level is slightly higher as indicated at 8 in FIG. 1 (about half an inch in practice). The reason for the difference in levels is partly because brine has a greater density than the normal ice lolly mixes and it is necessary to balance the pressure on each side of the mould walls to prevent mould distortion. The difference in levels between 8 and 7, which is usually between ¼ and ⅜ of an inch, will depend on the density of ice lolly mix selected and will need to be greater when the ice lolly mix is less dense through being aerated (eg an ice cream mix with normal overrun). Even when the densities are the same a slight difference in level has been found desirable to ensure a slight hydrostatic overpressure in the moulds to avoid localised stress conditions changing the shape of the final moulded article.

Solidification of the material in the mould then commences and as soon as the frozen outer shell has formed within the mix, the overfilled amount may be drawn off to bring the level of ice lolly mix to the same level 7 as the brine, or slightly lower. At this stage part of the mix may be replaced with a different type of mix to form a so-called split product, for example water ice and ice cream. Alternatively the mould can be lowered further into the freezant to equalise the levels.

When freezing is well advanced sticks 6 are then inserted in place in the mix by being mechanically guided relative to the top plate 3 — a conventional ice lolly forming step using conventional stick gripping and guiding equipment.

On completion of freezing, the stick will be firmly anchored, and subsequently withdrawing them relative to the top plate 3 will remove the completed ice lollies from the moulds. This is preceded by the standard practice of briefly contacting the moulds with warm liquid to slightly thaw each lolly surface.

FIG. 2 shows commencement of the withdrawal of the ice lollies from their moulds. During this process the mould progressively introverts and the commencement of this is shown in the Figure. To enable this to take place the wall of each mould has to have a high degree of flexibility as well as being capable of extending elastically at the waisted zone 5. The material has to be capable of withstanding repeated flexing and extension under low and varied temperatures.

Subsequent to removal of the ice lollies from the moulds, the moulds are pressed back to their original shape by shaped probes or by air jets.

The procedure of filling moulds prior to immersion in brine ensures that hydrostatic pressure from brine on the outside of the then unsupported mould walls does not cause the mould walls to collapse and adhere, and so make it impossible to perform the subsequent filling operation.

If however the equipment to be used dictates contact with brine sprays or a brine bath before filling, the problem can be overcome by supporting the moulds by air pressure prior to filling. A composite probe nozzle may be used which pushes the mould back from the introverted state for the next filling operation, applies air pressure from an air jet to prevent collapse of the mould walls from hydrostatic pressure, and then injects mix via a concentric nozzle surrounding the air jet to fill the mould. Preferably this probe nozzle should be formed of rubber or plastics material so as to minimise any risk of damage due to contact with the moulds.

What is claimed is:

1. A method of forming moulded ice confections of re-entrant shape comprising filling ice confection mix into a plurality of thin-wall flexible elastic moulds of cavity shape which is re-entrant along at least one wall surface from the deepest part of the mould to the mouth of the mould, inserting a handle into the ice confection mix in each mould, applying a liquid freezant to the outer surface of each mould so as to freeze the ice confection mix and anchor the handle while said thin-wall moulds are supported by said freezant, and withdrawing the handle so as to cause the moulds to distort and release an ice confection of re-entrant shape on the handle.

2. A method according to claim 1 in which the filled moulds are introduced into a liquid freezant tank to a position where liquid in the moulds is above that in the liquid freezant tank, and are maintained in this position until the shape has set by the exterior of the liquid within the mould becoming frozen.

3. A method according to claim 2 in which the liquid in the mould is brought to the same level as that in the liquid freezant tank subsequent to the setting of the mould shapes.

4. A method according to claim 3 in which the liquids are levelled by withdrawing liquid from the moulds.

5. A method according to claim 3 in which the liquids are levelled by immersing the moulds further into the liquid freezant tank.

* * * * *